(12) United States Patent
Stenzel et al.

(10) Patent No.: US 9,207,340 B2
(45) Date of Patent: *Dec. 8, 2015

(54) MARINE SEISMIC STREAMER CABLE WITH NOISE SUPPRESSING SENSOR SUPPORT

(75) Inventors: Andre Stenzel, Richmond, TX (US); Øyvind Hillesund, Nesbru (NO); Nils Lunde, Houston, TX (US); Stian Hegna, Hovik (NO)

(73) Assignee: PGS Geophysical AS, Oslo (NO)

( * ) Notice: Subject to any disclaimer, the term of this patent is extended or adjusted under 35 U.S.C. 154(b) by 1041 days.

This patent is subject to a terminal disclaimer.

(21) Appl. No.: 12/317,644

(22) Filed: Dec. 26, 2008

(65) Prior Publication Data

US 2010/0165792 A1   Jul. 1, 2010

(51) Int. Cl.
  *G01V 1/20* (2006.01)
  *G01V 1/38* (2006.01)
  *H04R 1/44* (2006.01)

(52) U.S. Cl.
  CPC ..................... *G01V 1/201* (2013.01)

(58) Field of Classification Search
  CPC ..................................................... G01V 1/201
  USPC .......... 174/101.5, 99 R; 367/15, 20, 149, 152, 367/171, 173, 174, 176, 19, 124, 129, 130, 367/154
  See application file for complete search history.

(56) References Cited

U.S. PATENT DOCUMENTS

| | | | | |
|---|---|---|---|---|
| 3,815,371 A | * | 6/1974 | Koehler | 405/227 |
| 4,296,481 A | * | 10/1981 | Weiss | 367/20 |
| 5,274,603 A | * | 12/1993 | Zibilich et al. | 367/20 |
| 7,239,577 B2 | | 7/2007 | Tenghamn et al. | |
| 7,298,672 B1 | * | 11/2007 | Tenghamn et al. | 367/176 |
| 7,733,740 B2 | * | 6/2010 | Hillesund et al. | 367/20 |
| 2004/0042341 A1 | * | 3/2004 | Tenghamn et al. | 367/15 |
| 2007/0064528 A1 | | 3/2007 | Metzbower et al. | |
| 2007/0091719 A1 | * | 4/2007 | Falkenberg et al. | 367/19 |
| 2010/0039889 A1 | * | 2/2010 | Teigen et al. | 367/20 |

FOREIGN PATENT DOCUMENTS

| | | |
|---|---|---|
| GB | 2 442 096 | 3/2008 |
| GB | 2 446 259 | 8/2008 |
| GB | 2446259 A * | 8/2008 |

OTHER PUBLICATIONS

Thorsten Vollmer, European Search Report, Date of Search: Sep. 23, 2011.

* cited by examiner

*Primary Examiner* — Daniel L Murphy

(57) ABSTRACT

A seismic streamer includes at least one elongated strength member. The seismic streamer further includes a substantially rigid sensor holder coupled to the strength member and fixed in position relative to the strength member. The streamer includes at least one particle motion sensor coupled to the sensor holder and fixed in position relative to the sensor holder.

28 Claims, 5 Drawing Sheets

MARINE SEISMIC STREAMER CABLE WITH NOISE SUPPRESSING SENSOR SUPPORT

BACKGROUND OF THE INVENTION

1. Field of the Invention

The invention relates generally to the field of marine seismic surveying. More specifically, the invention relates to structures for mounting particle motion sensors in a seismic streamer to reduce noise coupled to the particle motion sensor.

2. Background Art

In seismic exploration, geophysical data are obtained by applying acoustic energy to the earth at or near the surface and detecting seismic energy reflected from interfaces between different layers in subsurface formations. The acoustic energy is reflected when there is a difference in impedance between the layer above the interface and the layer below the interface. In marine seismic exploration, a seismic energy source, such as an air gun, for example, is typically used to generate acoustic energy. The acoustic energy is reflected back from subsurface interfaces below the water bottom and is detected by sensors deployed in the water or on the water bottom.

In a typical marine seismic operation, one or more streamers are towed behind an exploration vessel at a water depth between about six to about nine meters. The streamers are essentially long cables having seismic sensors disposed at spaced apart positions along the cable. Hydrophones are typically used as seismic sensors in marine streamers. A hydrophone is a pressure gradient sensor that converts pressure waves into electrical signals that are typically recorded for signal processing and evaluated to estimate characteristics of the earth's subsurface.

U.S. Pat. No. 7,239,577 issued to Tenghamn et al. and assigned to the assignee of the present invention describes the use in seismic streamers of particle motion sensor assemblies that have particle motion sensors such as geophones. Mounting of particle motion sensor assemblies in a seismic streamer according to methods known in the art includes lacing the sensor assemblies to a wire loom in selected locations along the length of the wire loom in a streamer section (a section being a discrete, separable segment of the streamer cable typically about 75 to 100 meters long). The wire loom, for constructional and operational reasons, is generally placed along a streamer section with a certain amount of slack, and is secured firmly only at the longitudinal position of certain types of spacers at selected positions along the length of the streamer section. In between the spacers the wire loom forms a "snake-like" shape. Therefore, the orientation and specific location of the particle motion sensor assemblies can be affected by the local orientation and shape of the wire loom at each sensor assembly. Although during initial construction of a streamer segment the sensor assemblies and the wire loom are placed in relatively precise locations, due to handling and movement of the segment in subsequent assembly steps, the location sensor assemblies can change. Also, the desired axial orientation of the particle motion sensor assemblies relative to the longitudinal axis of the streamer section can be disturbed. It has been observed that after a streamer section is completed, some sensor assemblies can be pressed against the streamer's outer jacket, or can be in contact with stress members that extend along the length of the streamer section and provide axial strength to the section. The foregoing may result in some types of vibration noise traveling along and across a streamer being transferred to the particle motion sensor assemblies and to a decrease of the sensor assemblies' sensitivity to seismic signals of interest due to improper orientation within the streamer.

There continues to be a need for improved structures for marine seismic streamers using particle motion sensors.

SUMMARY OF THE INVENTION

A seismic streamer according to one aspect of the invention includes at least one elongated strength member, a rigid sensor holder coupled to the at least one elongated strength member and fixed in position relative to the strength member, and at least one particle motion sensor coupled to the rigid sensor holder and fixed in position relative to the rigid sensor holder.

Other aspects and advantages of the invention will be apparent from the following description and the appended claims.

DETAILED DESCRIPTION

Figure 1:
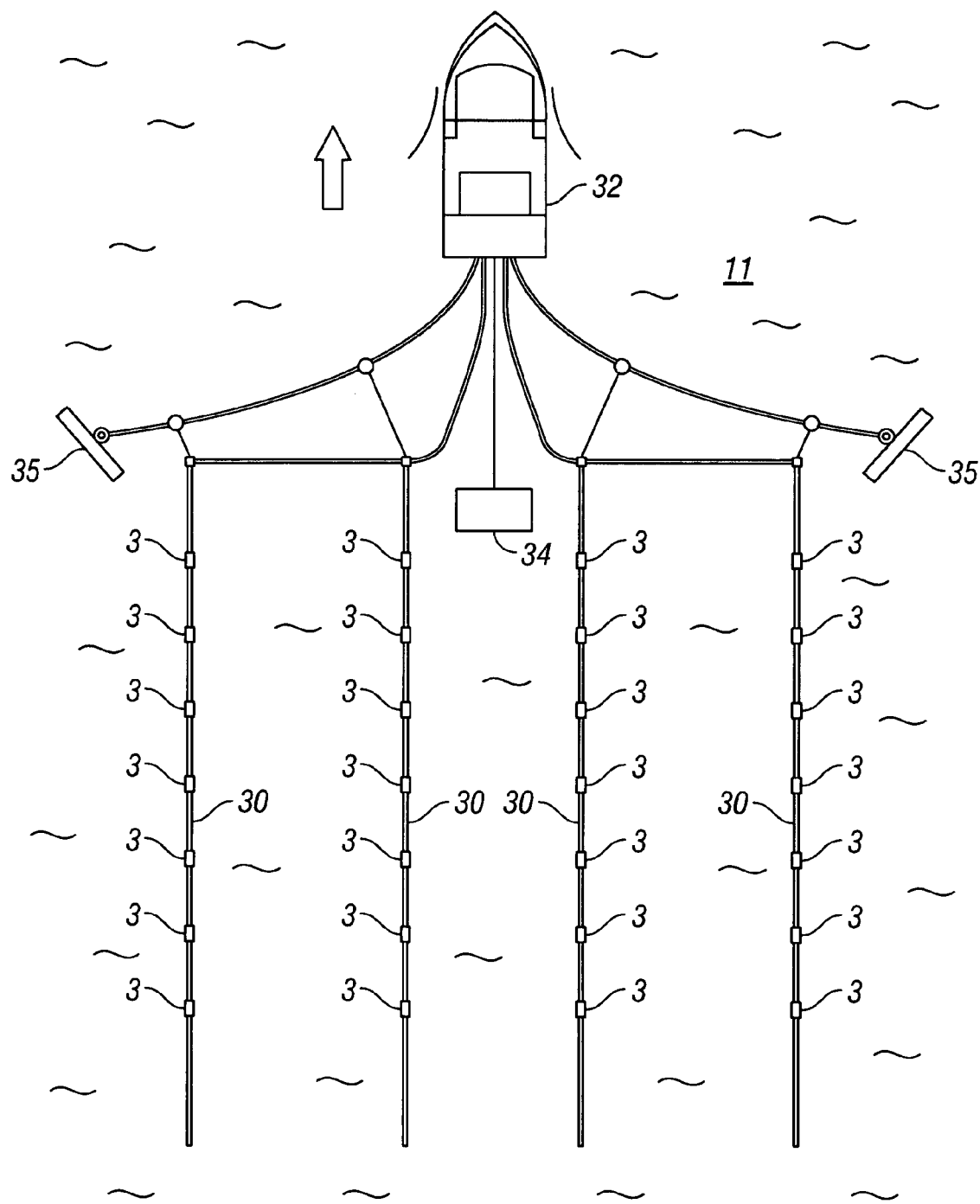
FIG. 1 is an overhead view of an example marine seismic surveying system.

FIG. 1 shows a typical marine seismic survey system in which a plurality of streamers 30 are towed behind a seismic survey vessel 32 moving on the surface of a body of water 11 such as a lake or the ocean. One or more seismic energy sources 34 can also be towed by the seismic vessel 32, or by another vessel. The seismic energy source 34, which can be an air gun or an array of air guns, but may also be a water gun or other type of marine seismic energy source known in the art, is actuated at selected times to impart seismic energy into formations below the bottom of the water 11. The seismic energy is reflected at acoustic impedance boundaries below the water bottom and such reflected energy can be detected by particle motion sensor assemblies 3 disposed at longitudinally spaced apart positions along each of the streamers 30. Paravanes 35 can be used to maintain the streamers 30 in desired lateral positions with respect to the centerline of the vessel 32 and with respect to each other. The invention may also be implemented, however, in seismic cables that are maintained at a substantially stationary position in a body of water, either on the water surface, at a selected depth below the water surface or deployed on the bottom of the body of water 11. In such cases the seismic energy source 34 may be towed behind a different vessel to generate seismic energy at varying locations. The seismic energy source 34 may also be maintained in a fixed position. The streamers 30 may or may not include pressure or pressure time gradient responsive sensors, such as hydrophones (not shown). Accordingly, the presence or absence of such pressure or pressure gradient responsive sensors in a seismic streamer is not intended to limit the scope of the present invention. Further, the example arrangement shown in FIG. 1 including four streamer cables 30, paravanes 35, and the source 34 all towed by the same vessel 32 is not a limitation on the scope of the present invention.

Figure 2:
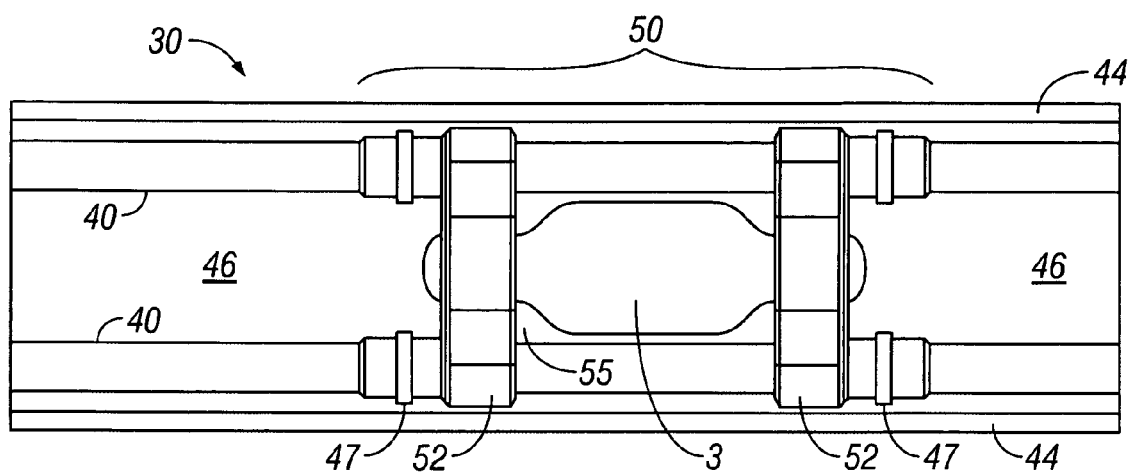
FIG. 2 shows a cut-away view of a portion of one of the streamer in the marine seismic surveying system of FIG. 1.

FIG. 2 shows a cut-away view of a portion of one of the streamer cables 30 where one of the particle motion sensor assemblies 3 is mounted in order to illustrate an example rigid sensor holder 50 according to the invention. The streamer cable 30 includes on its exterior an elongated, flexible, acoustically transparent, fluid tight jacket 44 such as may be made from polyurethane or similar material known in the art. One or more stress members or strength members 40 are disposed within the jacket 44 and extend along the streamer cable 30 and carry axial loading along and through the streamer cable 30. The strength members 40 may be made from fiber rope, the material for which may be a synthetic fiber sold under the trademark VECTRAN, which is a registered trademark of Hoechst Celanese Corp., New York, N.Y. Seismic particle motion assemblies 3 are positioned at selected longitudinal positions along the interior of the streamer cable 30.

The particle motion sensor assembly 3 is coupled to the strength members 40 by a substantially rigid sensor holder 50. The strength members 40 may be parallel to each other and spaced apart from each other, with the substantially rigid sensor holder 50 bridging the gap between them. In general, a plurality of substantially rigid sensor holders 50 may be positioned at selected locations along the length of the streamer cable 30 to couple the particle motion sensor assemblies 3 to the one or more strength members 40. A wire loom (not shown for clarity of the illustration) may make electrical and/or optical connections between the various electrical and/or optical components in the interior of the streamer cable 30, including a particle motion sensor forming a part of each particle motion sensor assembly 3.

Void spaces in the interior of the jacket 44 not occupied by the foregoing described components may be filled by a void fill material 46, which may be liquid such as kerosene or oil, or may be a curable gel. See, for example, U.S. Patent Application Publication No. 2007/0064528 filed by Metzbower et al., the underlying patent application for which is assigned to the assignee of the present invention, for a description of curable gel-like materials that may be used for the void fill material 46 in some examples.

The substantially rigid sensor holder 50 aligns the particle motion sensor assembly 3 with the strength members 40 and supports the particle motion sensor assembly 3 such that transverse and axial motions of the particle motion sensor assembly 3 relative to the strength members 40 are substantially prevented. The substantially rigid sensor holder 50 holds the particle motion sensor assembly 3 in fixed position relative to the strength members 40 in order to suppress noise from acceleration or from vibration of various components within the streamer cable 30. The invention may be used with any type of sensor that is responsive to particle motion, including but not limited to accelerometers, velocity meters, geophones, and multi-axial implementations of any or all of the foregoing. The substantially rigid sensor holder 50 is useful for a particle motion sensor mounted in a fixed orientation and for a particle motion sensor mounted in a gimbal bearing assembly for maintaining the sensor in a selected rotary orientation.

Figure 3:
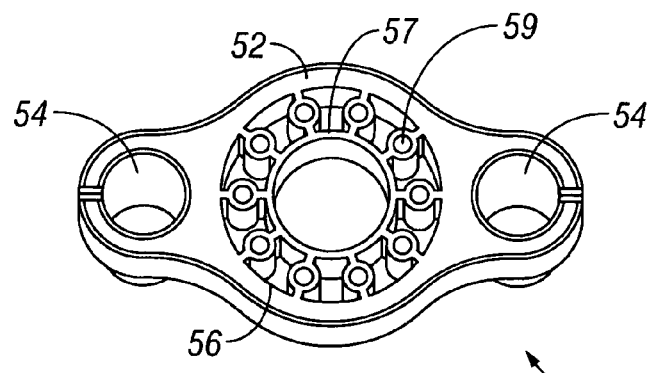
FIG. 3 is a perspective view of a rigid plate member of a rigid sensor holder used in the streamer cable of FIG. 2.

In one example, the substantially rigid sensor holder 50 includes a pair of rigid support plates 52, each of which is provided with a pair of apertures (54 in FIG. 3). The apertures (54 in FIG. 3) are sized such that they can be slid onto the strength members 40, thereby coupling the rigid support plates 52 to the strength members 40. The rigid support plates 52 are longitudinally spaced apart along the strength members 40, leaving a space 55 between them for receiving the particle motion assembly 3. Preferably, the rigid support plates 52 are locked to the strength members 40 so that they are fixed longitudinally relative to the strength members 40. Any suitable means of locking the rigid plates 52 to the strength members 40 may be used. As an example, the rigid support plates 52 may include tie-wraps 47 or similar banding devices to affix the rigid support plates 52 to the strength members 40. Other examples may use adhesive bonding to affix the support plates 52 to the strength members.

Referring to FIG. 3, each rigid support plate 52 may include a central receptacle 56 for receiving a longitudinal end portion of the particle motion sensor assembly (3 in FIG. 2). The receptacle 56 may simply be a hole or opening formed substantially in center of the rigid support plate 52. The receptacle 56 may be of a size and geometry such that when the longitudinal end portion of the particle motion sensor assembly (3 in FIG. 2) is received in the receptacle 56, the end portion of the particle motion sensor assembly is held fixed in place in the receptacle 56 by friction. Alternatively, locking features may be arranged in the receptacle 56 or adjacent to the receptacle 56 to engage the end portion of the particle motion sensor assembly and lock the particle motion sensor assembly to the rigid support plate 52. For example, FIG. 3 shows a mating ring 57 arranged in the receptacle 56. The mating ring 57 may define an internal diameter selected to engage an end portion of the particle motion sensor assembly (3 in FIG. 2) by interference fit. The mating ring 57 may be suspended within the receptacle 56 by a plurality of circumferentially spaced-apart spokes 59. The spokes 59 may be in the form of small diameter rigid tubes coupled to each of the interior wall of the receptacle 56 and the external wall of the mating ring 57.

Figure 4A:
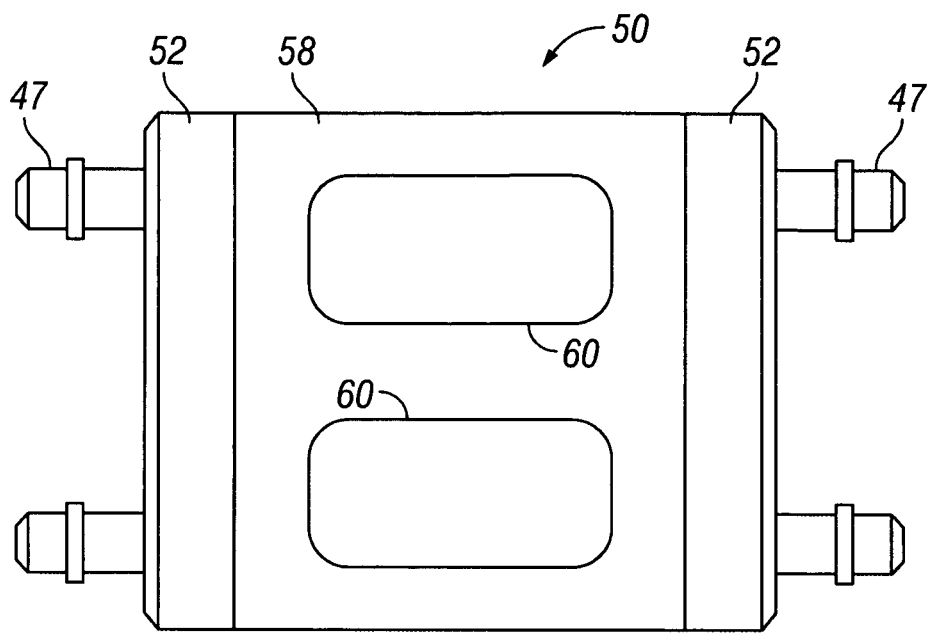
FIG. 4A shows a rigid sensor holder according to another embodiment of the invention.
Figure 4B:
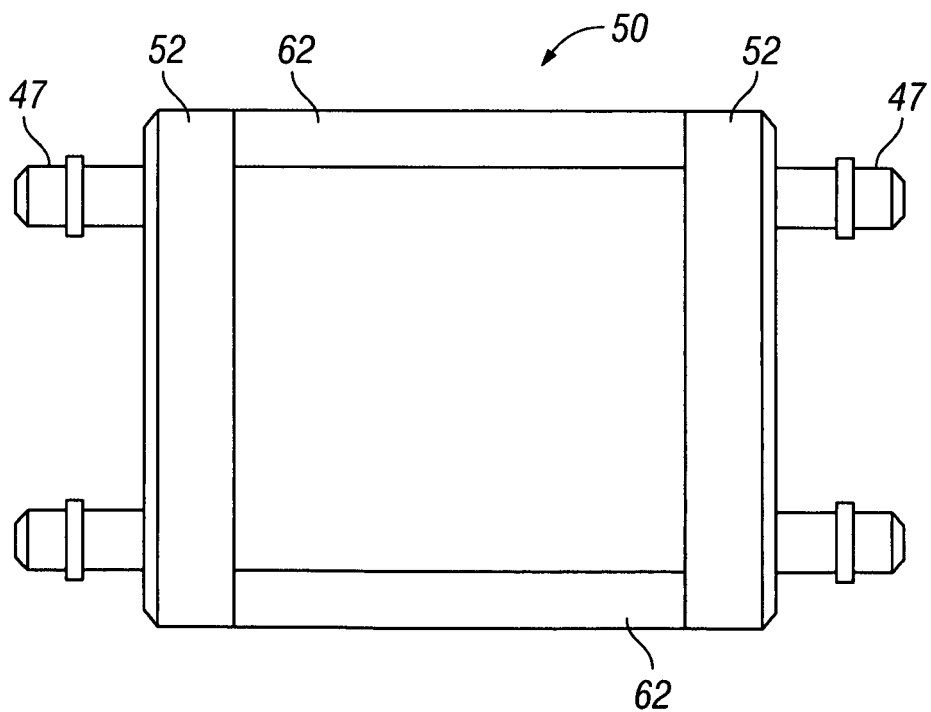
FIG. 4B shows a rigid sensor holder according to yet another embodiment of the invention.

Referring to FIG. 4A, in another example, the rigid sensor holder 50 may include a sleeve 58 between rigid support plates 52 mounted at the ends of the sleeve 58. The sleeve 58 may maintain a selected longitudinal spacing between the rigid support plates 52 and may also define an opening or chamber for receiving the particle motion sensor assembly (3 in FIG. 2). The sleeve 58 may include elongated slots 60. Referring to FIG. 4B, in another example, rigid spacers 62 may be mounted between the rigid support plates 52. The rigid spacers 62 may provide a selected longitudinal spacing between the rigid support plates 52. The rigid spacers 62 may be joined to the rigid plates 52 using any suitable joining method.

In each of FIGS. 2, 3, 4A and 4B, the sensor holder 50 is, or the parts constituting the sensor holder 50, e.g., rigid support plates 52, mating ring 57, spokes 59, sleeve 58, and/or spacers 62 are, preferably formed from a substantially rigid material such as a composite of glass fiber reinforced plastic, carbon fiber reinforced plastic, polypropylene or similar material. Other materials such as metals may be used to form the substantially rigid sensor holder 50. The term "substantially rigid" as used herein to describe the sensor holder 50 means that under expected stresses within the streamer the sensor holders 50 will not undergo substantial plastic deformation, and the compressibility of the material is sufficiently high such that under stresses ordinarily applied to the streamer during survey operations, the particle motion sensor will remain substantially axially aligned with the strength members. While metals may be used for the sensor holder 50 because they fall within the scope of the foregoing definition, as will be appreciated by those skilled in the art, the choice of materials should take account of the overall buoyancy that the streamer requires for any particular application. In the example shown in FIG. 3, it may be advantageous to use a material having some degree of resiliency while still maintaining the properties described above. Examples of such materials include nitrile rubber, in some examples having durometer reading of 75 to 80. Other example materials include hydrogenated nitrile butadiene rubber ("HNBR"), which may have durometer reading of 75 to 80. By using such resilient materials, substantial axial alignment may be maintained between the strength members and the particle motion sensor assembly, while at the same time reducing possible breakage of the sensor holder under bending stresses ordinarily encountered by a seismic streamer cable.

Referring to FIG. 3, the exterior shape of the rigid support plates 52 may be chosen as shown to provide a space between the interior wall of the jacket (44 in FIG. 2) and the exterior of the rigid sensor holder (50 in FIG. 2) for passage of the wire loom (not shown) or other internal components of the streamer cable (30 in FIG. 2). The exterior shape of the rigid support plates 52 shown in FIG. 3 may also facilitate filling of void spaces within the streamer cable with the void fill material (46 in FIG. 2). However, the particular exterior shape of the rigid support plates 52 is not a limitation on the scope of this invention.

Figure 5:
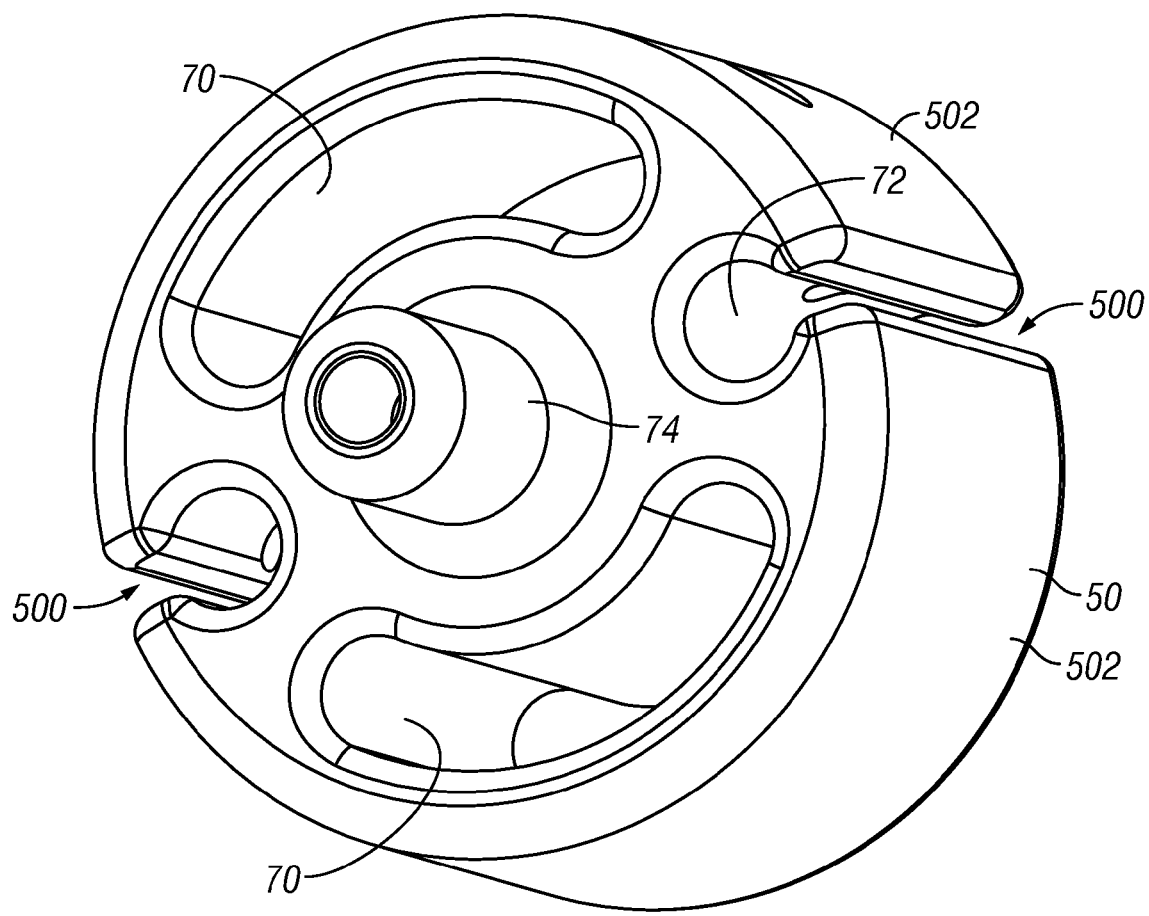
FIG. 5 shows another example of a sensor holder.

FIG. 5 shows another example of a sensor holder. The sensor holder 50 may be approximately circularly shaped in cross section and have a diameter selected to occupy substantially the entire cross section inside the streamer jacket. Openings 72 may extend through the sensor holder 50, and the strength members may pass through the openings 72 and be secured, such as by adhesive. Each opening is associated with a slot 500 that extends between the opening 72 and the outer surface 502, and each slot runs the length of its respective opening. Other openings 70 may provide passage for cables, wires and other internal components of the streamer. A sensor housing 74, which may form an enclosure about the particle motion sensor (and together which may be equivalent to the assembly 3 shown in FIG. 2) may be disposed approximately in the center of the sensor holder 50, and thus approximately in the center of the cross section of the streamer. The sensor holder 50 may have longitudinal dimension, that is, along the direction of the strength members, such that most or substantially all of the sensor housing 74 is disposed within the sensor holder 50. In some examples, the sensor housing 74 may be integrally formed with the sensor holder 50. If the sensor holder shown in FIG. 5 is used, only one need be used with each particle motion sensor assembly, as contrasted with the two end plates used in the example of FIG. 2.

Figure 6:
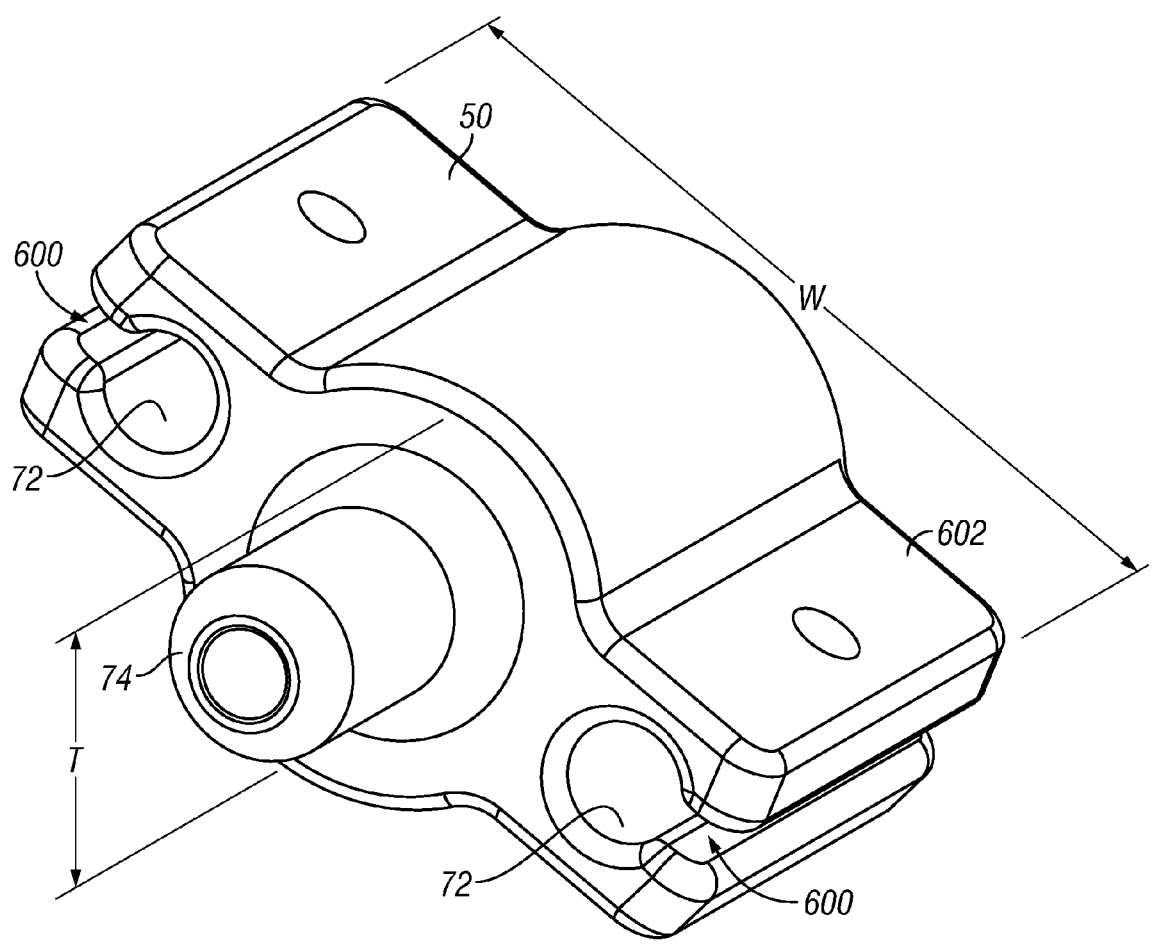
FIG. 6 shows another example of a sensor holder.

Another example sensor holder is shown at 50 in FIG. 6. The example in FIG. 6 may have similar longitudinal dimension as the example of FIG. 5, but may include a different cross sectional shape intended to occupy a smaller portion of the cross sectional area of the streamer. Much like the embodiment of FIG. 5, the sensor holder 50 of FIG. 6 defines openings 72 that may extend through the sensor holder 50, and the strength members may pass through the openings 72 and be secured, such as by adhesive. Each opening 72 is associated with a slot 600 that extends between the opening 72 and the outer surface 602, and each slot runs the length of its respective opening. Further, the sensor holder of FIG. 6 defines a width W being the longer dimension, and a thickness T being the shorter dimension, the thickness T measured perpendicular to the width W. As illustrated the thickness T is smaller than the width W. The exterior shape of the sensor holder 50 is similar to that of the rigid support plates 52 of FIG. 3, and thus provide a space between the interior wall of the jacket (44 in FIG. 2) and the exterior of the rigid sensor holder (50 in FIG. 2) for passage of the wire loom (not shown) or other internal components of the streamer cable (30 in FIG. 2).

Vibrations traveling along the seismic streamer are a major source of noise detected by particle motion sensor assemblies contained within a seismic streamer that includes such sensors. Such vibrations can generally be separated into axial vibrations transported along the strength members at high velocities, typically greater than 1000 m/s, and transverse vibrations of the streamer traveling in a direction transverse to the strength members at low velocities, typically 15-70 m/s. A rigid sensor holder in a streamer according to the invention supports and fixes a particle motion sensor assembly relative to strength members in the streamer in order to suppress noise contributions from the vibrations traveling along the seismic streamer. Using a rigid sensor holder as in the invention, measurements made by the particle motion sensor assembly can have a better signal-to-noise ratio than using sensor mounting techniques known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer cable, comprising:
    elongated strength members;
    a plurality of sensor holders spaced longitudinally along the elongated strength members;
    a first sensor holder of the plurality of sensor holders, the first sensor holder comprising
        a first support plate comprising a first pair of apertures, the first support plate coupled to the elongated strength members by way of the first pair of apertures;
        a first receptacle defined by the first support plate;
        a second support plate comprising a second pair of apertures, the second support plate coupled to the elongated strength members by way of the second pair of apertures;
        a second receptacle defined by the second support plate;
        a space defined between the first support plate and the second support plate, the support plates fixed in longitudinal position relative to each other by way of each support plate's respective couplings to the elongated strength members; and
        a particle motion sensor assembly that defines a first longitudinal end portion and a second longitudinal end portion opposite the first longitudinal end portion, the first longitudinal end portion telescoped with the first receptacle, and the second longitudinal end portion telescoped with the second receptacle, and the particle motion sensor assembly spanning the space defined between the first and second support plates.

2. The seismic streamer cable of claim 1, further comprising an elongated jacket, and wherein the elongated strength members, the plurality of sensor holders and the particle motion sensor are disposed within the elongated jacket.

3. The seismic streamer cable of claim 1, wherein the particle motion sensor is at least one selected from the group consisting of: a geophone; and an accelerometer.

4. The seismic streamer of claim 1, wherein the first and second support plates are each made of at least one selected from the group consisting of: nitrile rubber; hydrogenated nitrile butadiene rubber; polypropylene; glass fiber reinforced plastic; and carbon fiber reinforced plastic.

5. The seismic streamer cable of claim 1:
wherein the first receptacle is defined by a first ring having an inside diameter, and the first ring coupled to remaining portions of the first support plate by a first plurality of radially extending spokes; and
wherein the second receptacle is defined by a second ring having an inside diameter, and the second ring coupled to remaining portions of the second support plate by a second plurality of radially extending spokes.

6. A seismic survey system, comprising:
a seismic survey vessel;
a plurality of streamers coupled at a forward end thereof to the survey vessel, each streamer including elongated strength members extending along the length of the streamer;
a plurality of substantially rigid sensor holders coupled to the strength member at spaced apart locations, each sensor holder comprising
a first support plate comprising a first pair of apertures, the first support plate coupled to the elongated strength members by way of the first pair of apertures;
a first receptacle defined by the first support plate;
a second support plate comprising a second pair of apertures, the second support plate coupled to the strength members by way of the second pair of apertures;
a second receptacle defined by the second support plate;
a space defined between the first support plate and the second support plate, each support plate being coupled to the elongated strength members and fixed in position relative to the elongated strength members by way of their respective couplings to the elongated strength members; and
a particle motion sensor assembly that defines a first longitudinal end portion and a second longitudinal end portion opposite the first longitudinal end portion, the first longitudinal end portion telescoped with the first receptacle, and the second longitudinal end portion telescoped with the second receptacle.

7. The seismic survey system of claim 6 further comprising an elongated jacket, and wherein the elongated strength members, the sensor holders, and the particle motion sensor are disposed within the elongated jacket.

8. The seismic survey system of claim 6, wherein the particle motion sensor is at least one selected from the group consisting of: a geophone; and an accelerometer.

9. The seismic survey system of claim 6, wherein each of the first and second support plates are made of at least one selected from the group consisting of: nitrile rubber; hydrogenated nitrile butadiene rubber; polypropylene; glass fiber reinforced plastic; and carbon fiber reinforced plastic.

10. The seismic survey system of claim 6:
wherein the first receptacle is defined by a first ring having an inside diameter, and the first ring coupled to remaining portions of the first support plate by a first plurality of radially extending spokes; and
wherein the second receptacle is defined by a second ring having an inside diameter, and the second ring coupled to remaining portions of the second support plate by a second plurality of radially extending spokes.

11. A seismic streamer cable, comprising:
a first elongated strength member and a second elongated strength member;
a substantially rigid sensor holder comprising
an outer surface that defines a circular cross section;
a first cable passage that extends through the sensor holder;
a second cable passage that extends through the sensor holder;
a first opening that extends through the sensor holder;
a first slot that extends between the first opening and the outer surface;
a second opening that extends through the sensor holder;
a second slot that extends between the second opening and the outer surface;
a sensor housing disposed within the sensor holder;
said first elongated strength member coupled within the first opening, and the second elongated strength member coupled within the second opening, such that the sensor holder maintains substantial axial alignment with the elongated strength members; and
at least one particle motion sensor coupled to the sensor housing and fixed in position relative to the sensor holder, the at least one particle motion sensor mounted directly to the sensor holder so as to maintain substantial axial alignment with the sensor holder.

12. The seismic streamer cable of claim 11, further comprising an elongated jacket, and wherein the elongated strength members, the sensor holder and the particle motion sensor are disposed within the elongated jacket.

13. The seismic streamer cable of claim 12, further comprising a void fill material disposed inside the jacket.

14. The seismic streamer cable of claim 13, wherein the void fill material comprises curable gel.

15. The seismic streamer cable of claim 11, wherein the at least one particle motion sensor comprises at least one of a geophone and an accelerometer.

16. The seismic streamer of claim 11, wherein the rigid sensor holder is made of at least one material selected from the group consisting of: nitrile rubber; hydrogenated nitrile butadiene rubber; polypropylene; glass fiber reinforced plastic; and carbon fiber reinforced plastic.

17. The seismic streamer of claim 11 wherein the rigid sensor holder is integrally formed with a housing enclosing the sensor.

18. The seismic streamer of claim 11 wherein the sensor housing is configured so that the sensor is disposed in a center of a cross section of the streamer.

19. A seismic streamer cable, comprising:
a first elongated strength member and a second elongated strength member;
a substantially rigid sensor holder;
a particle motion sensor;
an elongated jacket, and wherein the elongated strength members, the sensor holder and the particle motion sensor are disposed within the elongated jacket;
wherein the substantially rigid sensor holder comprises
an outer surface;
a width defined by the outer surface;
a thickness defined by the outer surface, the thickness perpendicular to the width, and where the thickness is smaller than the width;
a first opening that extends through the sensor holder;
a first slot that extends between the first opening and the outer surface;
a second opening that extends through the sensor holder;
a second slot that extends between the second opening and the outer surface;
a sensor housing disposed within the sensor holder;
a wire loom disposed between an interior wall of the elongated jacket and the thickness of the sensor holder;

said first elongated strength member coupled within the first opening, and the second elongated strength member coupled within the second opening, such that the sensor holder maintains substantial axial alignment with the elongated strength members; and said particle motion sensor coupled to the sensor housing and fixed in position relative to the sensor holder, the particle motion sensor mounted directly to the sensor holder so as to maintain substantial axial alignment with the sensor holder.

20. A seismic survey system, comprising:
a seismic survey vessel;
a plurality of streamers coupled at a forward end thereof to the survey vessel, each streamer including a first and second elongated strength members extending along the length of the streamer;
a plurality of substantially rigid sensor holders coupled to the strength members at spaced apart locations, each sensor holder comprising
   an outer surface that defines a circular cross section;
   a first cable passage that extends through the sensor holder;
   a second cable passage that extends through the sensor holder;
   a first opening that extends through the sensor holder;
   a first slot that extends between the first opening and the outer surface;
   a second opening that extends through the sensor holder;
   a second slot that extends between the second opening and the outer surface; and
   the first elongated strength member coupled within the first opening, and the second elongated strength member coupled with the second opening such that each sensor holder maintains substantial axial alignment with the elongated strength members; and
a plurality of particle motion sensors coupled one each to each rigid sensor holder and fixed in position relative to the respective sensor holder, each particle motion sensor mounted directly to the sensor holder so as to maintain substantial axial alignment with the respective sensor holder.

21. The seismic survey system of claim 20, wherein each streamer further comprises an elongated jacket, and wherein the elongated strength members, the sensor holders and the particle motion sensors are disposed within the respective elongated jacket.

22. The seismic survey system of claim 21, further comprising a void fill material disposed inside each elongated jacket.

23. The seismic survey system of claim 22, wherein the void fill material comprises curable gel.

24. The seismic survey of claim 20, wherein each particle motion sensor comprises at least one of a geophone and an accelerometer.

25. The seismic survey system of claim 20, wherein each rigid sensor holder is made of at least one material selected from the group consisting of: nitrile rubber; hydrogenated nitrile butadiene rubber; polypropylene; glass fiber reinforced plastic; and carbon fiber reinforced plastic.

26. The seismic survey system of claim 20 wherein each rigid sensor holder is integrally formed with a housing enclosing each sensor.

27. The seismic survey system of claim 20 wherein each sensor holder is configured so that each sensor is disposed in a center of a cross section of the streamer.

28. A seismic survey system, comprising:
a seismic survey vessel;
a plurality of streamers coupled at a forward end thereof to the survey vessel, each streamer including a first and second elongated strength members extending along the length of the streamer;
a plurality of substantially rigid sensor holders coupled to the strength members at spaced apart locations;
a plurality of particle motion sensors;
an elongated jacket, and wherein the elongated strength members, the sensor holders and the plurality of particle motion sensors are disposed within the respective elongated jacket;
where each substantially rigid sensor holder comprises
   an outer surface;
   a width defined by the outer surface;
   a thickness defined by the outer surface, the thickness perpendicular to the width, and where the thickness is smaller than the width; and
   a first opening that extends through the sensor holder;
   a first slot that extends between the first opening and the outer surface;
   a second opening that extends through the sensor holder;
   a second slot that extends between the second opening and the outer surface; and
   the first elongated strength member coupled within the first opening, and the second elongated strength member coupled with the second opening such that each sensor holder maintains substantial axial alignment with the elongated strength members; and
a wire loom disposed between an interior wall of the elongated jacket and the thickness of the sensor holder;
said plurality of particle motion sensors coupled one each to each rigid sensor holder and fixed in position relative to the respective sensor holder, each particle motion sensor mounted directly to the sensor holder so as to maintain substantial axial alignment with the respective sensor holder.

* * * * *